US010007169B1

(12) United States Patent
Ziemkiewicz et al.

(10) Patent No.: US 10,007,169 B1
(45) Date of Patent: Jun. 26, 2018

(54) ARRAY OF SUB-APERTURE REFRACTIVE ELEMENTS FOR STEERING A LIGHT BEAM

(71) Applicant: Analog Devices, Inc., Norwood, MA (US)

(72) Inventors: Michael Ziemkiewicz, Norwood, MA (US); Scott Robert Davis, Denver, CO (US); Michael Howard Anderson, Lyons, CO (US); Tyler Adam Dunn, North Reading, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days. days.

(21) Appl. No.: 15/479,999

(22) Filed: Apr. 5, 2017

(51) Int. Cl.
*G02F 1/295* (2006.01)
*G02F 1/29* (2006.01)

(52) U.S. Cl.
CPC .............. *G02F 1/295* (2013.01); *G02F 1/292* (2013.01); *G02F 1/2955* (2013.01); *G02F 2201/06* (2013.01); *G02F 2201/16* (2013.01); *G02F 2203/24* (2013.01)

(58) Field of Classification Search
CPC .......... G02F 1/292; G02F 1/295; G02F 1/313; G02F 1/2955; G02F 2203/24
USPC .................................................. 385/4, 8, 10
See application file for complete search history.

(56) References Cited

U.S. PATENT DOCUMENTS

| | | | | |
|---|---|---|---|---|
| 5,802,223 A * | 9/1998 | Nashimoto | ............. | G02F 1/295 385/2 |
| 5,920,662 A * | 7/1999 | Hinkov | ................... | G02F 1/295 359/322 |
| 6,400,855 B1 * | 6/2002 | Li | .......................... | G02F 1/2955 385/16 |
| 7,027,670 B2 * | 4/2006 | Aoki | ....................... | G02F 1/295 385/10 |
| 7,720,116 B2 | 5/2010 | Anderson et al. | | |
| 8,311,372 B2 | 11/2012 | Anderson et al. | | |
| 8,380,025 B2 | 2/2013 | Anderson et al. | | |
| 8,463,080 B1 | 6/2013 | Anderson et al. | | |
| 8,860,897 B1 | 10/2014 | Anderson et al. | | |
| 8,989,523 B2 | 3/2015 | Anderson et al. | | |
| 9,366,938 B1 | 6/2016 | Anderson et al. | | |
| 2002/0114556 A1 * | 8/2002 | Kato | ...................... | G02B 6/125 385/16 |
| 2003/0118262 A1 * | 6/2003 | Aoki | ....................... | G02F 1/295 385/8 |

(Continued)

*Primary Examiner* — Robert Tavlykaev
(74) *Attorney, Agent, or Firm* — Schwegman Lundberg & Woessner, P.A.

(57) ABSTRACT

The present subject matter includes apparatus and techniques that can be used to reduce losses in systems that perform steering of a light beam. Such steering can be performed in a non-mechanical manner, such as using an electrically-controlled optical structure (e.g., an electro-optical structure). For example, a waveguide can be used to adjust an angle of a light beam (e.g., steer the light beam). The waveguide can include a core, a cladding including an electro-optic material, and electrodes defining an arrangement that, when selectively energized, adjusts an index of refraction of the electro-optic material. In particular, electrode arrangements as described herein can be used to reduce losses, such as losses that would occur due to diffraction.

23 Claims, 9 Drawing Sheets

(56) References Cited

U.S. PATENT DOCUMENTS

| | | | |
|---|---|---|---|
| 2005/0123228 A1* | 6/2005 | Nishizawa | G02F 1/313 385/4 |
| 2005/0271325 A1* | 12/2005 | Anderson | G02F 1/295 385/40 |
| 2009/0015904 A1* | 1/2009 | Okayama | G02F 1/29 359/315 |
| 2013/0258452 A1* | 10/2013 | Kamiguchi | G02F 1/2955 359/315 |
| 2013/0259417 A1* | 10/2013 | Kamiguchi | G02F 1/2955 385/8 |
| 2017/0153530 A1 | 6/2017 | Anderson et al. | |
| 2017/0192264 A1 | 7/2017 | Anderson et al. | |

\* cited by examiner

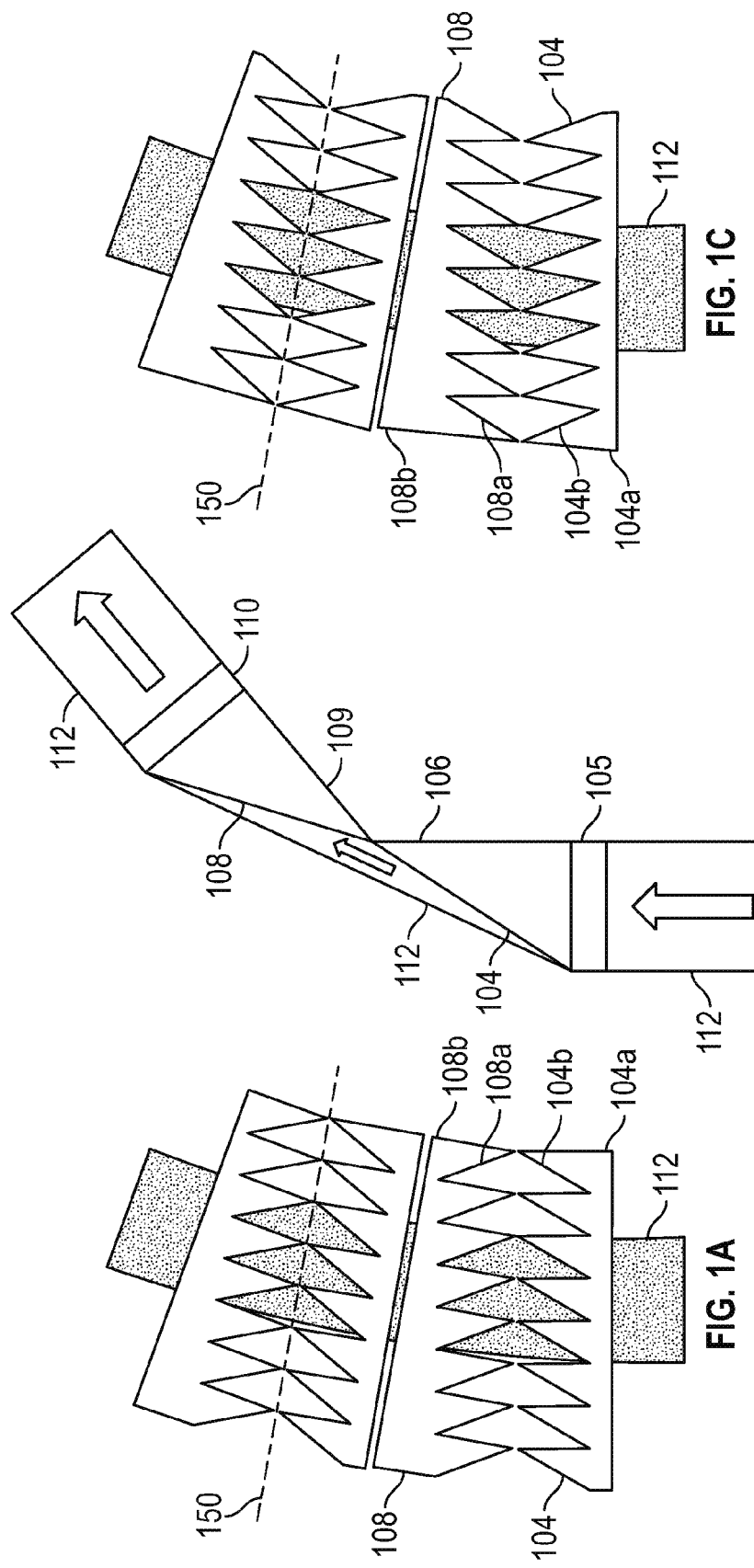

ARRAY OF SUB-APERTURE REFRACTIVE ELEMENTS FOR STEERING A LIGHT BEAM

FIELD OF THE DISCLOSURE

The present disclosure relates to systems and methods for steering a light beam.

BACKGROUND

Certain non-mechanical beam steering systems include an array of refractive elements that can dynamically adjust an angle of a light beam. As the light beam undergoes refraction, the light beam can be compressed, which can cause diffraction of the light beam.

SUMMARY OF THE DISCLOSURE

The present subject matter includes apparatus and techniques that can be used to reduce losses in systems that perform steering of a light beam. Such steering can be performed in a non-mechanical manner, such as using an electrically-controlled optical structure (e.g., an electro-optical structure). For example, a waveguide can be used to adjust an angle of a light beam (e.g., steer the light beam). The waveguide can include a core, a cladding including an electro-optic material, and electrodes defining an arrangement that, when selectively energized, adjusts an index of refraction of the electro-optic material. In particular, electrode arrangements as described herein can be used to reduce losses, such as losses that would occur due to diffraction.

In certain systems, a light beam can suffer from diffractive effects, such as due to spatial variations in an amplitude or phase of a wavefront of the light beam. Such diffractive effects can lead to reduced power in a desired portion of the light beam. The inventors have recognized, among other things, the need for a beam steering system having reduced diffractive effects, such as to reduce diffractive losses. Further features of the disclosure are provided in the appended claims, which features may optionally be combined with each other in any permutation or combination, unless expressly indicated otherwise elsewhere in this document.

In an aspect, the disclosure can feature an apparatus including an arrangement of sub-aperture refractive tapered projections for adjusting an angle of a light beam with reduced diffractive losses. The apparatus can include a first row of the projections, such as to receive light at a first base interconnecting the projections in the first row, and such as to provide refracted light toward a direction of distal peaks of the projections of the first row. The apparatus can also include a second row of the projections, such as to receive light from a direction of distal peaks of the projections of the second row, which can be arranged facing corresponding projections of the first row, the second row can provide further refracted light in a direction of a second base interconnecting the projections in the second row. The facing corresponding projections can respectively include facing corresponding slanted first faces forming an obtuse angle with respect to each other, and slanted with respect to their respective first and second bases, and facing corresponding perpendicular second faces, aligned with respect to each other, and perpendicular to their respective first and second bases. An individual one of the sub-projections in the first row can be capable of refractively adjusting an angle of a corresponding sub-aperture portion of the light beam and decreasing a size of the corresponding sub-aperture portion of the light beam, and a corresponding individual one of the projections in the second row can be capable of receiving a sub-aperture portion of the light beam from a corresponding individual one of the sub-aperture refractive elements in the first row, further adjusting an angle of the received corresponding sub-aperture portion of the light beam and counteracting a decrease in the size of the corresponding sub-aperture portion of the light beam, such as that caused by the individual one of the sub-aperture refractive elements in the first row. An individual one of the projections in the first row can include a first refractive surface having a first orientation and a corresponding individual one of the projections in the second row can include a second refractive surface having a second orientation, wherein the first refractive surface and the second refractive surface can have the same shape and the first orientation can be opposite to the second orientation. The first row of the projections and the second row of the projections can include at least one projection having a triangular shaped cross section or a wedge shaped cross section. A refractive index and arrangement are such that an individual one of the projections in the first row can be capable of adjusting an angle of the light beam by an angle in the range of zero to two degrees. An individual one of the projections in the first row can be shaped such that a difference in an optical path length between an adjacent portion of the individual one of the projections and an adjacent portion of a neighboring projection can be an integer number of wavelengths of the light beam. The apparatus can also include successive first and second rows of projections, wherein the distal peaks of a successive first row face the distal peaks of a corresponding successive second row. The apparatus can also include a waveguide core shaped to guide the light beam along a length of a waveguide, a cladding including an electro-optic material capable of an interaction with a portion of the light beam, and at least one electrode shaped and arranged to adjust an angle of the light beam in an in-plane direction by adjusting an index of refraction of the electro-optic material. The apparatus can also include a row of compensation electrodes shaped and arranged to provide an adjustable phase shift between adjacent sub-aperture portions of the guided light beam to reduce phase discontinuities in adjacent sub-aperture portions of the light beam.

In an aspect, the disclosure can feature a waveguide for adjusting an angle of a light beam in an in-plane direction. The waveguide can include a waveguide core shaped, such as to guide a light beam along a length of the waveguide. The waveguide can also include a cladding including an electro-optic material capable of an interaction with a portion of the light beam. The waveguide can also include electrodes shaped and arranged, such as to adjust an angle of the light beam in an in-plane direction by adjusting an index of refraction of the electro-optic material, wherein the arrangement of electrodes can include a first row of projections interconnected by a first base and capable of adjusting an angle of corresponding sub-aperture portions of the light beam and decreasing a size of the corresponding sub-aperture portions of the light beam by adjusting an index of refraction of the corresponding electro-optic material, and a second row of projections interconnected by a second base and capable of further adjusting an angle of corresponding sub-aperture portions of the light beam and counteracting a decrease in the size of the corresponding sub-aperture portions of the light beam caused by the first row of projections by adjusting an index of refraction of the corresponding electro-optic material. An individual one of the projections in the first row can include a first cross sectional shape having a first orientation and a corresponding individual one of the projections in the second row can include a second cross sectional shape having a second orientation, wherein the first cross sectional shape and the second cross sectional shape can be the same and the first orientation can be opposite to the second orientation. An individual one of projections in the first row and a corresponding individual one of the projections in the second row can have a triangular shaped cross section or a wedge shaped cross section. An individual one of the projections in the first row can be capable of adjusting an angle of the light beam by an angle in the range of zero to two degrees. An individual one of the projections in the first row can be shaped such that a difference in an optical path length between an adjacent portion of a corresponding region of the electro-optic material and a corresponding portion of electro-optic material corresponding to a neighboring projection can be an integer number of wavelengths of the light beam when a full steering voltage or zero voltage is applied to the first row of projections, such as to provide a uniform output wavefront. The arrangement of electrodes can include a row of phase compensation electrodes shaped, such as to provide an adjustable phase shift between adjacent sub-aperture portions of the guided light beam, such as to reduce phase discontinuities in adjacent portions of the light beam at intermediate steering voltages.

In an aspect, the disclosure can feature a method of using an arrangement of sub-aperture refractive tapered projections for adjusting an angle of a light beam, such as with reduced diffractive losses. The method can include receiving light at a first base interconnecting projections in a first row, and providing refracted light toward a direction of distal peaks of the projections of the first row. The method can also include receiving light from a direction of distal peaks of the projections of a second row, which are arranged facing corresponding projections of the first row and, using the second row, providing further refracted light in a direction of a second base interconnecting the projections in the second row. The method can also include providing a first electrode shaped, such as to provide the base and projections in the first row by adjusting an index of refraction of a corresponding portion of electro-optic material in a cladding of a waveguide and a second electrode shaped, such as to provide the base and projections in the second row by adjusting an index of refraction of a corresponding portion of electro-optic material in the cladding of the waveguide The method can also include applying a full steering voltage to the first electrode, such as to cause corresponding sub-aperture portions of the light beam to decrease in size to provide a separation between adjacent sub-aperture portions of the light beam, and applying an intermediate steering voltage to the second electrode, such as to counteract the decrease in the size of the corresponding sub-aperture portions of the light beam to reduce the separation between adjacent sub-aperture portions of the light beam. The method can also include providing a first electrode shaped, such as to provide the base and projections in the first row and a second electrode shaped, such as to provide the base and projections in the second row, the first electrode and the second electrode can have the same cross-sectional shape and an opposite orientation. The method can also include providing a first electrode shaped, such as to provide the base and projections in the first row and a second electrode shaped, such as to provide the base and projections in the second row, wherein the projections in the first row and the projections in the second row can have a triangular shaped cross section or a wedge shaped cross section. The method can also include applying a voltage to the first electrode, such as to adjust an angle of the light beam by an angle in the range of zero to two degrees. The method can also include providing a first electrode shaped, such as to provide the base and projections in the first row by decreasing an index of refraction of a corresponding portion of electro-optic material in a cladding of a waveguide and a second electrode shaped, such as to provide the base and projections in the second row by decreasing an index of refraction of a corresponding portion of electro-optic material in the cladding of the waveguide

BRIEF DESCRIPTION OF THE DRAWINGS

The present disclosure will now be described, by way of example, with reference to the accompanying drawings, in which:

FIG. 1A illustrates an example of an arrangement of sub-aperture refractive elements.

FIG. 1B illustrates an example of a pair of sub-aperture refractive elements within an arrangement of sub-aperture refractive elements.

FIG. 1C illustrates an example of an arrangement of sub-aperture refractive elements.

DETAILED DESCRIPTION OF EMBODIMENTS OF THE DISCLOSURE

Figure 2A:
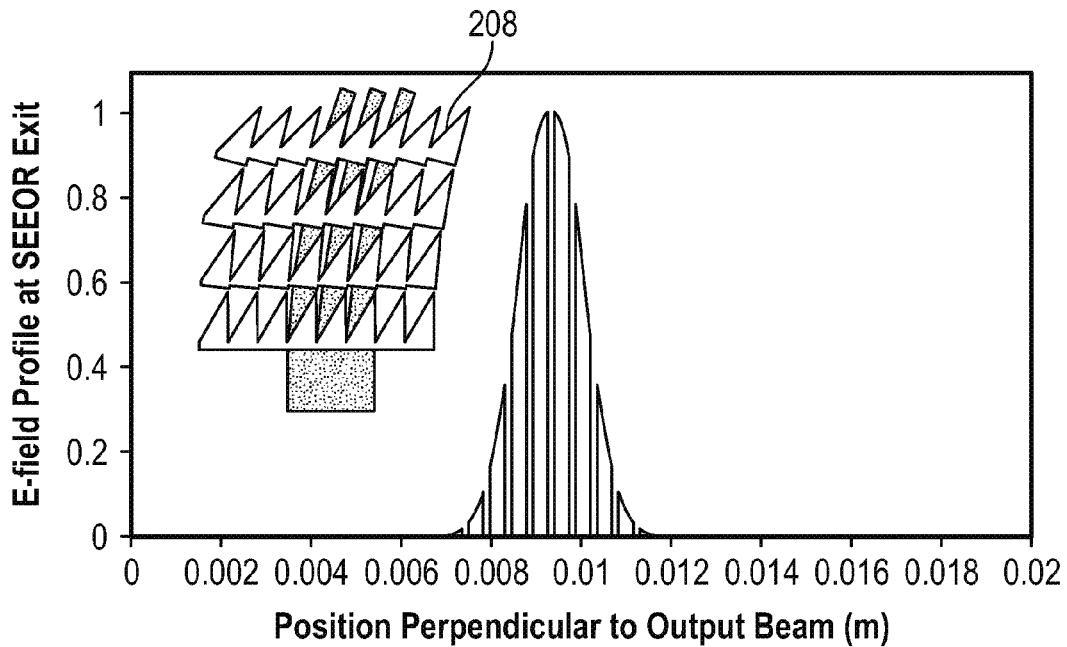
FIG. 2A-2B illustrate an electric field profile of a light beam exiting an arrangement of sub-aperture refractive elements.

FIG. 1A illustrates an example of an arrangement of sub-aperture refractive elements. The arrangement of sub-aperture refractive elements can include a first row of sub-aperture refractive elements 104 and a second row of sub-aperture refractive elements 108. The first row of sub-aperture refractive elements 104 can include a first interface 104a and a second interface 104b. The second row of sub-aperture refractive elements can include a first interface 108a and a second interface 108b. During operation, a light beam 112 can be incident upon the first interface 104a and travel to the second interface 104b where the light beam can undergo refraction. In addition to being refracted at the second interface 104b, a size of the light beam 112 can decrease upon being refracted at the second interface 104b, such as due to a relative angle of the second interface 104b relative to a direction of the light beam 112. In an example where the light beam 112 can extend over several of the sub-aperture refractive elements in the first row 104, a reduction in the size of each corresponding portion of the light beam can result in spatial amplitude variations in a wavefront of the light beam and can lead to increased diffraction of the light beam. The light beam 112 can travel towards, and be incident upon a first interface 108a after being refracted by the second interface 104a. The light beam can be refracted by the first interface 108a and then travel to the second interface 108b before exiting the second row of sub-aperture refractive elements 108. In addition to being refracted at the first interface 108a, a size of the light beam 112 can increase upon being refracted at the first interface 108a, such as due to a relative angle of the first interface 108a relative to a direction of the light beam 112. In an example where the light beam 112 can extend over several of the sub-aperture refractive elements in the second row 108, an increase in the size of each corresponding portion of the light beam can counteract corresponding decreases in the size of each corresponding portion of the light beam, such as that caused by the first row of sub-aperture refractive elements 104. Counteracting the decreases in the size of each corresponding portion of the light beam, such as that caused by the first row of sub-aperture refractive elements 104 can provide reduced amplitude variations in a wavefront of the light beam and can provide reduced diffractive effects. In an example, successive rows of sub-aperture refractive elements can provide further refraction of the light beam 112 while providing alternating reductions in beam size and increases in beam size, similar to the first and second rows of sub-aperture refractive elements 104 and 108. In an example, a row of refractive elements can be positioned such as to provide a set of distal points that can form a line, such as line 150 that can be parallel to a wavefront of the light beam at full steering (e.g., when a maximum voltage is applied to the row of refractive elements).

FIG. 13B illustrates an example of a sub-aperture refractive element 104, a sub-aperture refractive element 108, and a corresponding sub-aperture portion of the light beam 112. The sub-aperture refractive element 104 can include a tapered projection 106 and a base 105. The sub-aperture refractive element 108 can include a tapered projection 109 and a base 110. In an example, a base can extend across and connect a plurality of tapered projections, such as tapered projection 106. In an example, such as where the base can extend across the plurality of tapered projections, a thickness of the base can vary (e.g., the thickness of the base can have a linear thickness profile). The tapered projection 106 and the tapered projection 109 can include faces forming an obtuse angle. The faces of the tapered projection 106 can be slanted with respect to the base 105 and the faces of the tapered projection 108 can be slanted with respect to the base 110. During operation, the base 105 can receive a sub-aperture portion of the light beam 112. The sub-aperture portion of the light beam 112 can travel through the base 105 and the tapered projection 106. The sub-aperture portion of the light beam 112 can be refracted by a face of the tapered projection and travel towards a face of the tapered projection 109. The refraction at the face of the tapered projection 106 can provide a change in the angle ($\Delta\varphi$) of the sub-aperture portion of the light beam 112, and additionally, can reduce a size of the sub-aperture portion of the light beam 112. The sub-aperture portion of the light beam 112 can then be refracted by the tapered projection 109, which can provide an additional change in the angle of $\Delta\varphi$, for a total change in angle of $2\Delta\varphi$. The refraction at the tapered projection 109 can counteract the decrease in size of the light beam caused by the refraction at the tapered projection 106. The sub-aperture portion of the light beam 112 can then travel through the sub-aperture refractive element 108 and exit at the base 110. FIG. 1C illustrates an example of an arrangement of sub-aperture refractive elements, similar to the arrangement shown in FIG. 1A, except where the sub-aperture refractive elements can be oriented, such as to refract the light beam 112 in an example where an index of refraction of the sub-aperture refractive elements can be smaller than an index of refraction outside of the sub-aperture refractive elements.

FIG. 2A illustrates an example of an electric field profile of a light beam exiting an arrangement of sub-aperture refractive elements, such as the arrangement shown in the inset 208. In an arrangement, such as that shown in the inset 208, each successive row of sub-aperture refractive elements can refract an incident light beam and additionally can reduce a size of each sub-aperture portion of the light beam. After propagation through the arrangement, the light beam can have a spatial variation in an electric field amplitude.

Figure 2B:
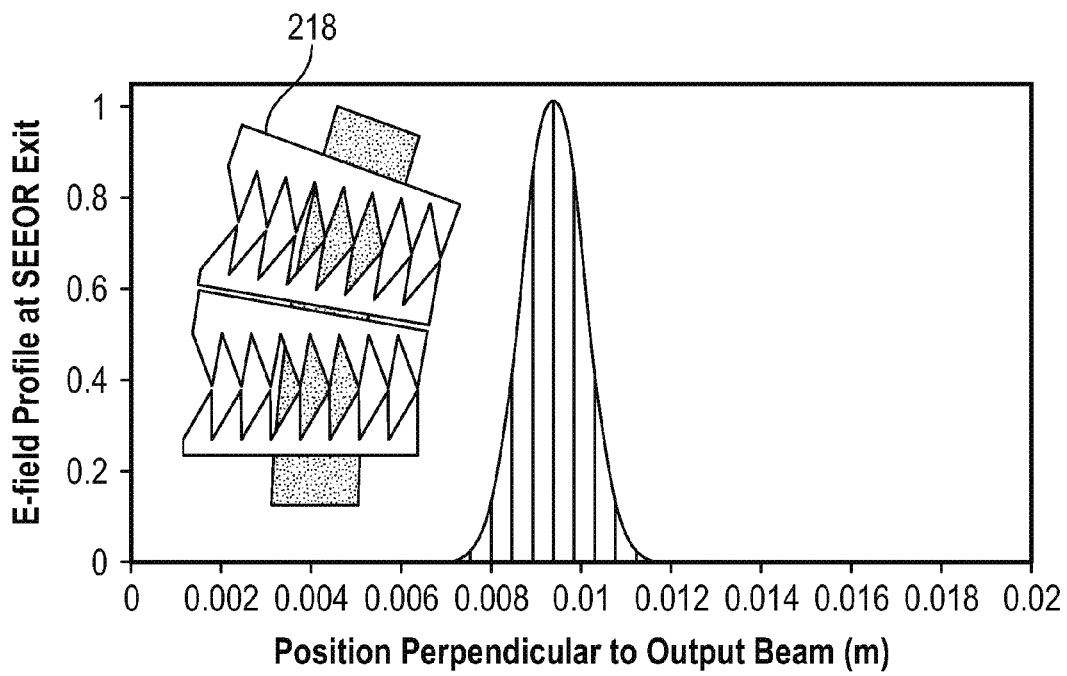

FIG. 2B illustrates an example of an electric field profile of a light beam exiting an arrangement of sub-aperture refractive elements, such as the arrangement shown in FIG. 1A and in the inset 218. In an arrangement, such as that shown in FIG. 1A, each successive row of sub-aperture refractive elements can further refract an incident light beam, but a size of the light beam can be alternatingly reduced and increased (e.g., odd rows can provide for a reduction in the size of the light beam and even rows can provide for an increase in the size of the light beam).

Figure 3A:
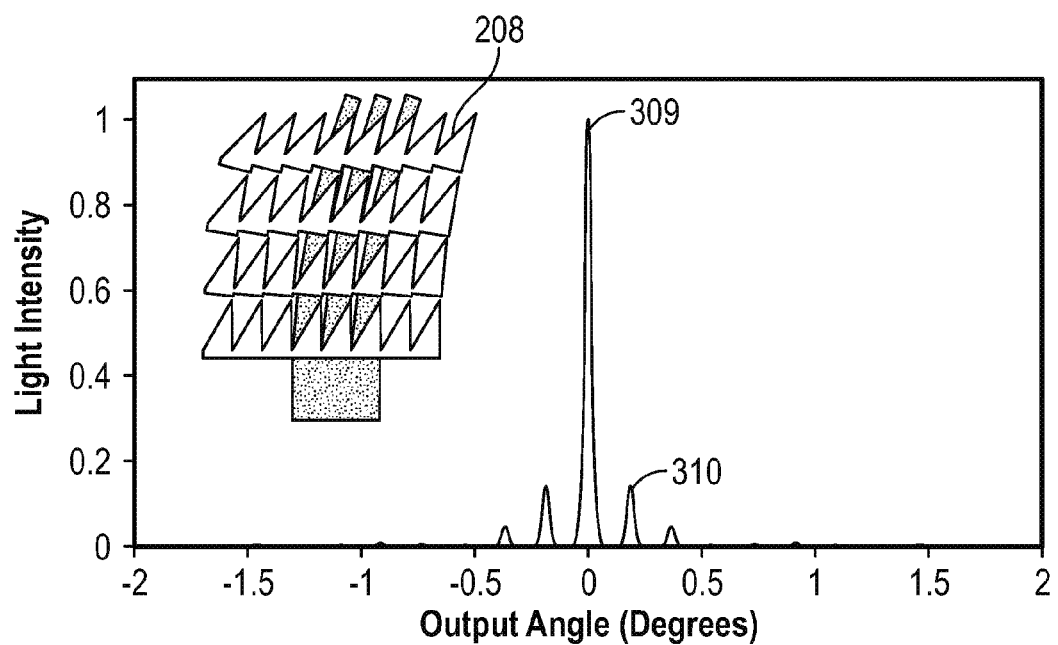
FIGS. 3A-3B illustrate a diffraction pattern of a light beam exiting an arrangement of sub-aperture refractive elements.

FIG. 3A illustrates a diffraction pattern of a light beam exiting an arrangement of sub-aperture refractive elements, such as the "racetrack" arrangement shown in the inset 208. The arrangement of sub-aperture refractive elements can include twelve rows of 60° prisms, each having a base width of 479 μm, and a waist of a light beam with a wavelength of 1.55 um can be 0.5 mm. A total length of the arrangement can be approximately 13 mm. An index of refraction of the refractive elements can be 1.9 and an index of refraction outside of the refractive elements can be 1.88. A field of regard of the arrangement can be 25° and Fresnel losses from internal reflections can be limited to 0.60%. The diffraction pattern can include a primary peak 309 and several secondary peaks 310. In the example shown in FIG. 3A, approximately 31% of the power of the light beam can be contained in the secondary peaks 310.

Figure 3B:
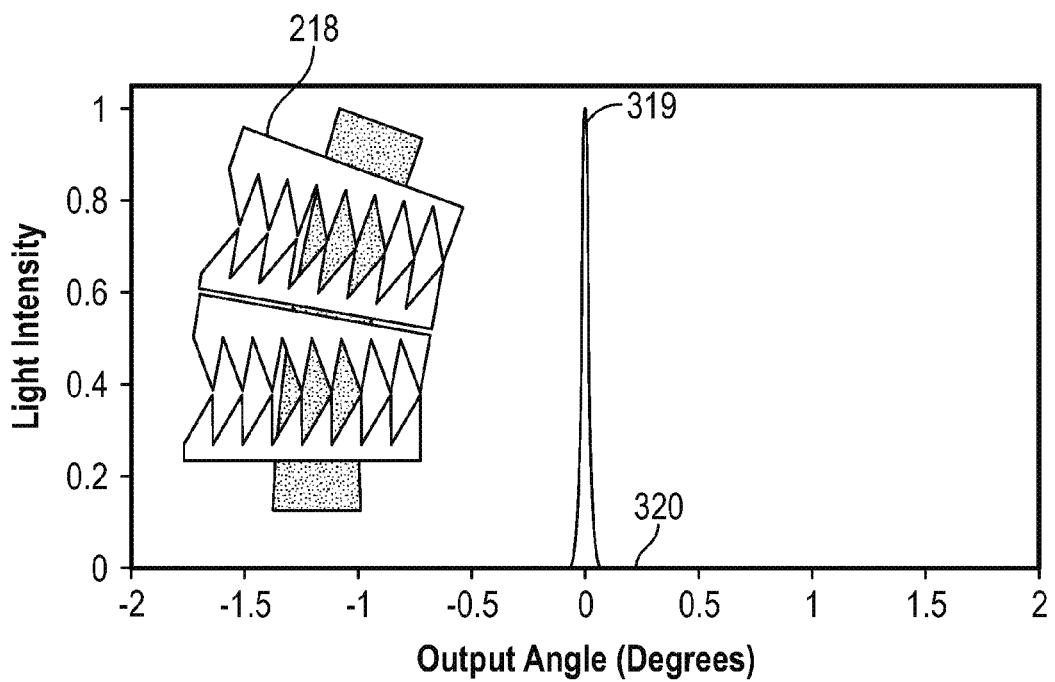

FIG. 3B illustrates a worst-case diffraction pattern of a light beam exiting an arrangement of sub-aperture refractive elements, such as the "jaws" arrangement shown in the inset 218. The arrangement of sub-aperture refractive elements can include twelve rows of 600 prisms, each having a base width of 479 μm, and a waist of the light beam can be 0.5 mm. A total length of the arrangement can be approximately 13 mm. An index of refraction of the refractive elements can be 1.9 and an index of refraction outside of the refractive elements can be 1.88. A field of regard of the arrangement can be 25° and Fresnel losses from internal reflections can be limited to 0.60%. The worst-case diffraction pattern can occur when a final row of prisms is inactive, for example, the first row of prisms can be at full steering and all remaining rows of prisms can be inactive, or in another example, the first three rows of prisms can be at full steering and all remaining rows of prisms can be inactive. The worst-case diffraction pattern can include a primary peak 319 and several secondary peaks 320. In the example shown in FIG. 3A, approximately 3% of the power of the light beam can be contained in the secondary peaks 320.

Figure 3C:
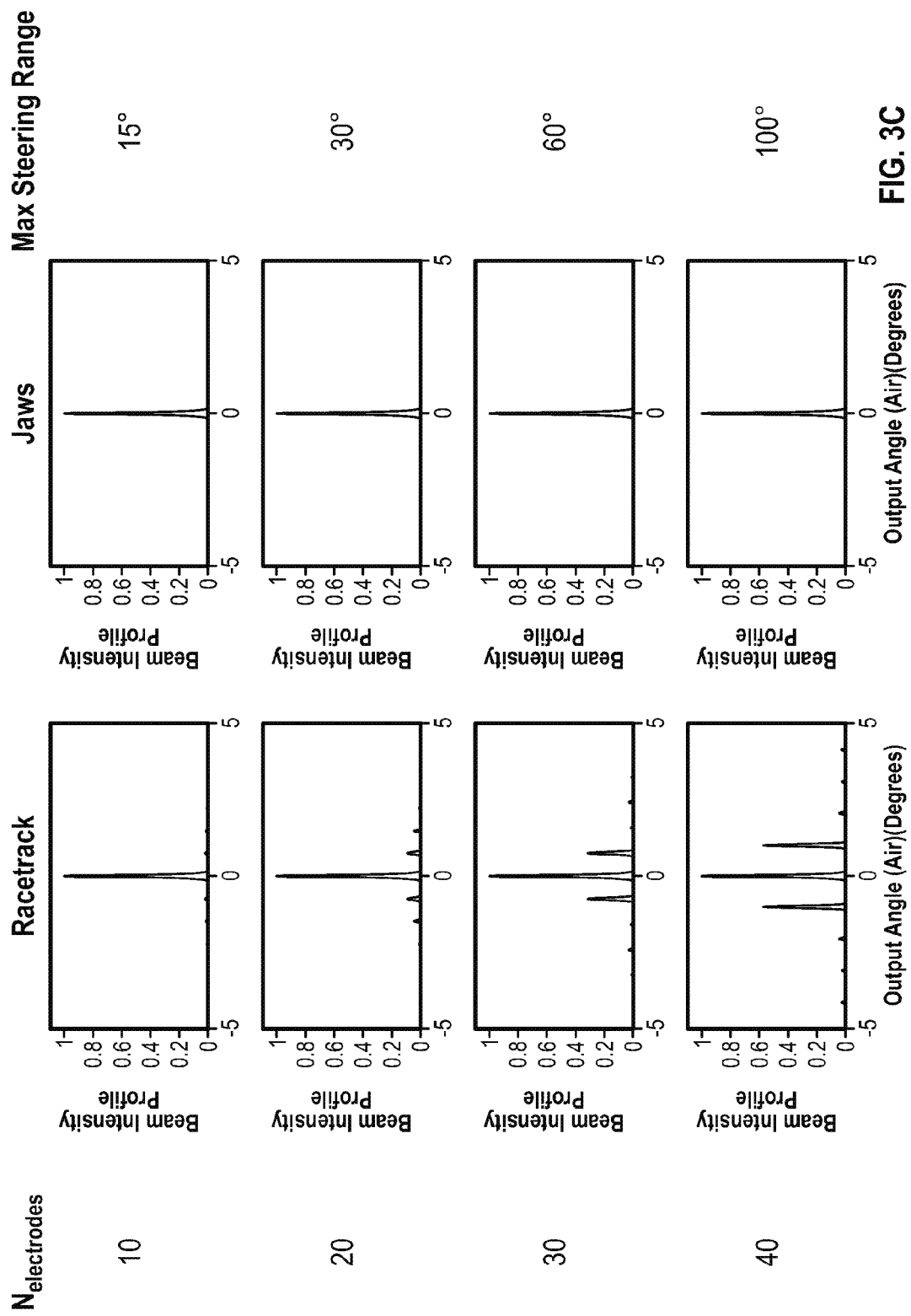
FIG. 3C illustrates an example of diffraction patterns for various arrangements of electrodes.

FIG. 3C illustrates examples of diffraction patterns for "racetrack" arrangements of electrodes such as those shown in FIG. 3A and inset 208 and "jaws" arrangements such as those shown in FIG. 3B and inset 218. In the examples shown in FIG. 3C, the diffraction peaks in a "racetrack" arrangement steadily increase as the number of electrodes is increased, while the worst-case diffraction peaks in a "jaws" arrangement remain the same, independent of the number of electrodes.

Figure 4:
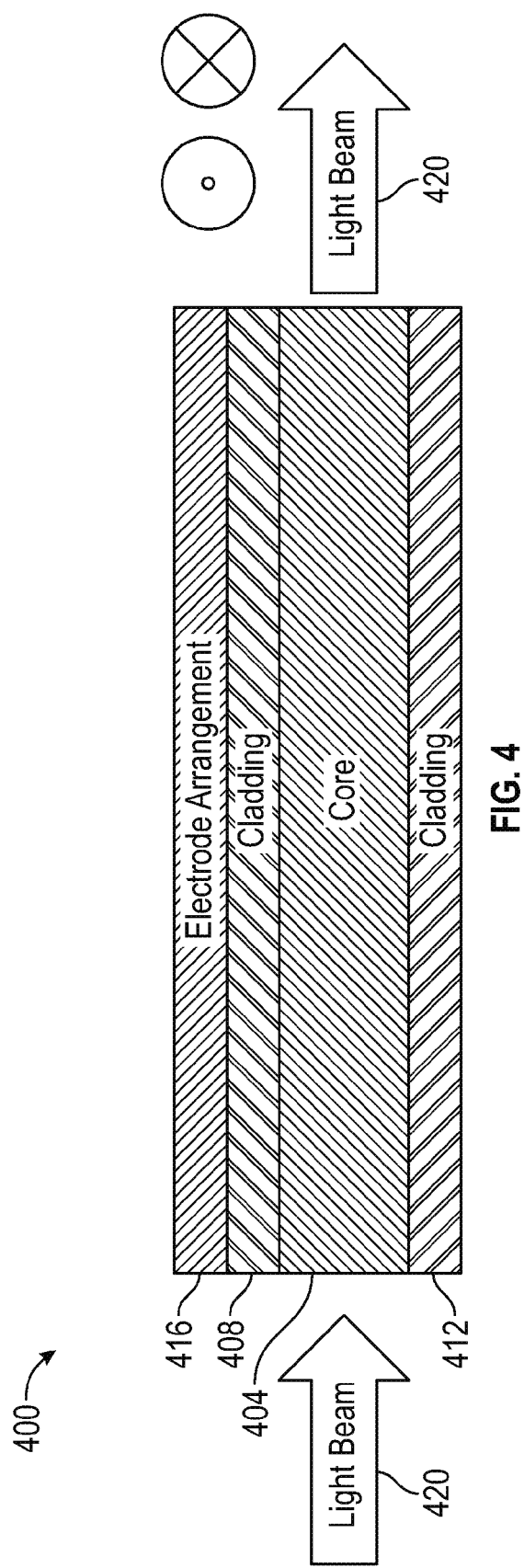
FIG. 4 illustrates an example of a waveguide.

FIG. 4 illustrates an example of a cross-sectional view of a waveguide 400. The waveguide can include a core 404, an upper cladding 408, a lower cladding 412, and an electrode arrangement 416. The upper cladding 408 can include a liquid crystal material. The liquid crystal material can have an adjustable index of refraction. The electrode arrangement 416 can include a pattern, such as the pattern shown in FIG. 1A. During operation, a light beam 420 can be guided through the waveguide core. A set of voltages can be applied to the electrode arrangement 416, such as to adjust an index of refraction in the upper cladding 408. In an example where the electrode arrangement 416 can include a pattern as shown in FIG. 1A, an increase in a voltage applied to the electrode arrangement 416 can provide an increased index of refraction in the upper cladding 408. In an example where the electrode arrangement 416 can include a pattern as shown in FIG. 1C, the liquid crystal material can include a homeotropic liquid crystal material and an increase in a voltage applied to the electrode arrangement 416 can provide a decreased index of refraction in the upper cladding 408. In response to the applied voltages, a pattern of refractive shapes can be formed in the upper cladding, the pattern of refractive shapes being the same as the shape of the electrode arrangement 416. In an example where the electrode arrangement 416 includes a pattern as shown in FIG. 1A, the refractive shapes formed in the upper cladding 408 can include the pattern shown in FIG. 1A. The refractive shapes formed in the upper cladding 408 can provide for an adjustment of an angle of the light beam 420, similar to the adjustment of the light beam angle provided by the arrangement shown in FIG. 1A. The angle of the light beam 420 can be adjusted in an in-plane direction of the waveguide (e.g., into or out of the page as shown in FIG. 4). In an example, the waveguide can be a planar waveguide.

Figure 5A:
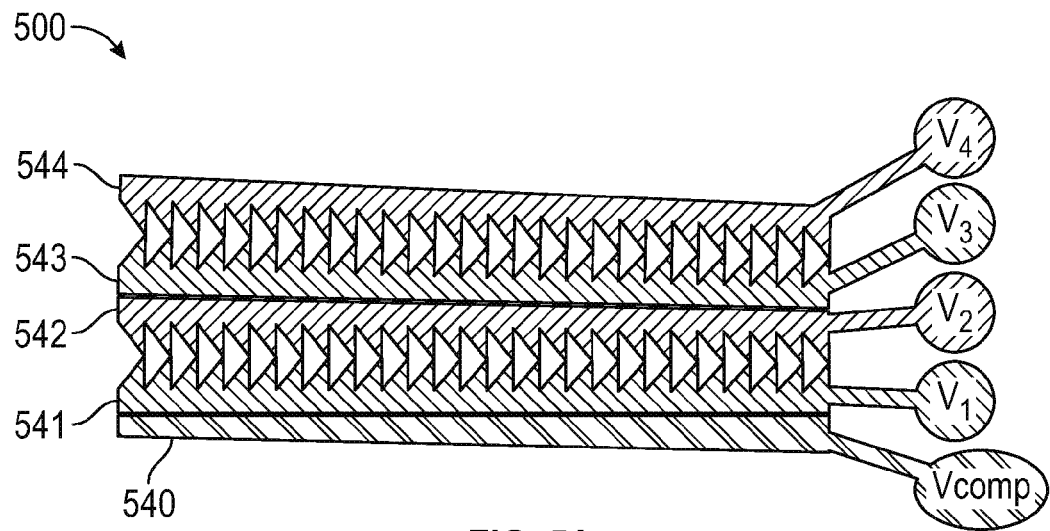
FIG. 5A illustrates an example of an electrode arrangement.
Figure 5B:
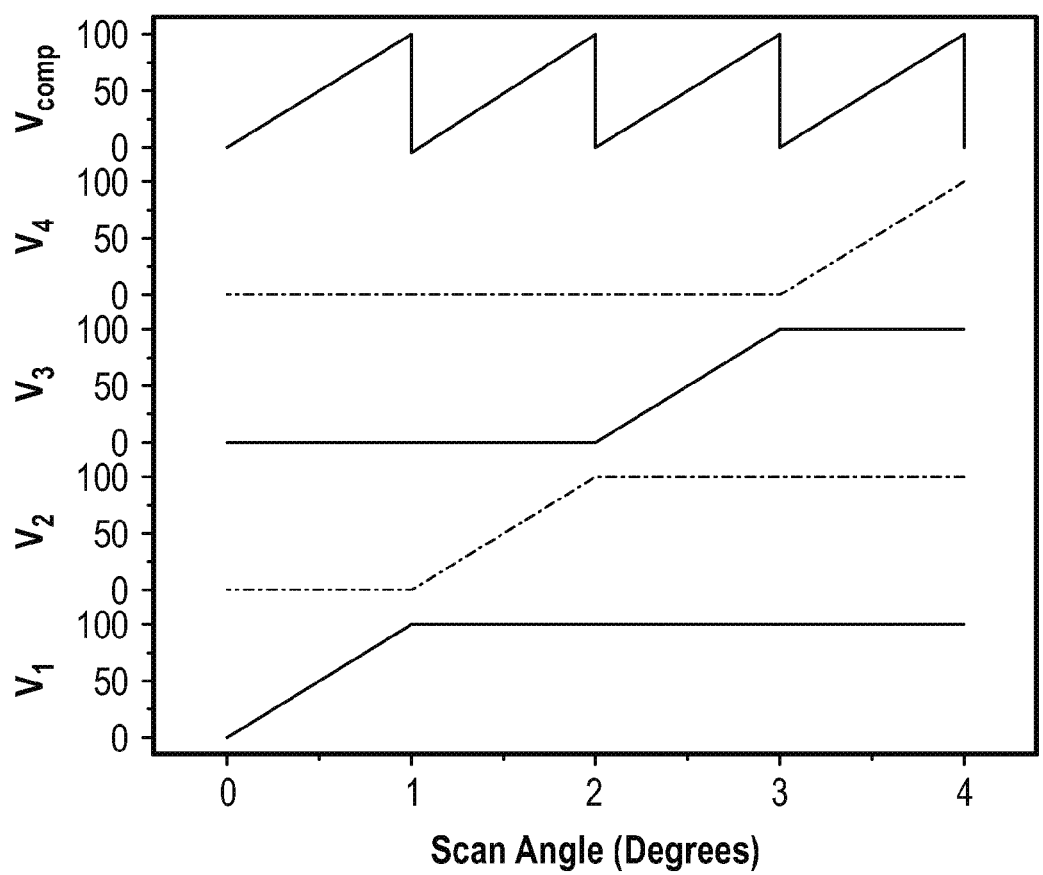
FIG. 5B illustrates a method of operation of an electrode arrangement.

FIG. 5A illustrates an example of an electrode arrangement 500, such as the electrode arrangement 416 shown in FIG. 4. The electrode arrangement can include a phase compensation electrode 540, a first row of electrodes 541, a second row of electrodes 542, a third row of electrodes 543, and a fourth row of electrodes 544. Each of the electrodes 540-544 can be controlled independently. During operation, a steering voltage (V1) can be applied to the first row of electrodes 541 as illustrated in FIG. 5B. The applied steering voltage V1 can adjust an index of refraction of a cladding, such as the upper cladding 408 as shown in FIG. 4. The applied steering voltage V1 can cause a corresponding first row of refractive shapes to form in the cladding and the first row of refractive shapes in the cladding can provide for an adjustment of an angle of a light beam travelling through a waveguide, such as the light beam 420 travelling through waveguide 400. The first row of refractive shapes can also provide for a decrease in the size of each sub-aperture portion of the light beam. The adjustment in the angle of the light beam can increase as the value of the steering voltage V1 increases from zero through a range of intermediate steering values, and at full steering, the steering voltage V1 can have a maximum value corresponding to a maximum adjustment in the angle of the light beam caused by the first row of electrodes. A value of the maximum voltage can be 100 V and a corresponding maximum adjustment in the angle of the light beam caused by the first row of electrodes can be 1 degree. In an example, the maximum voltage can be 100 V and a corresponding maximum adjustment in the angle of the light beam caused by the first row of electrodes can be in a range from 0 to 10 degrees. A maximum value of the steering voltage V1 can correspond to an adjusted angle of the light beam, such that each sub-aperture portion of the light beam can be incident upon a corresponding refractive shape in the second row of refractive shapes. At voltages beyond the maximum value of the steering voltage V1, each sub-aperture portion of the light beam can be incident upon more than one refractive shape in the second row of refractive shapes, such as can lead to losses in the light beam.

As illustrated in FIG. 5B, a voltage phase compensation voltage Vcomp can be applied to the phase compensation electrode 540 during the application of the steering voltage V1, such as to reduce spatial phase discontinuities in the light beam, such as those caused by different optical path lengths between adjacent portions of the first row of refractive shapes. The phase compensation voltage Vcomp can be increased as a value of the applied steering voltage V1 is increased. The first row of electrodes can be shaped and sized such that when the steering voltage V1 is at zero volts or a maximum voltage, spatial phase discontinuities in the light beam can be reduced, such that the applied phase compensation voltage Vcomp can be set to zero. For example, a size and shape of an individual refractive shape in the first row can provide an optical path length difference between a portion of the individual refractive shape and a corresponding portion of a neighboring individual refractive shape that can be an integer multiple of wavelengths of the light beam when a voltage applied to the first row is approximately zero volts or at a maximum voltage, such as to allow light to exit each individual refractive shape with a uniform output wavefront.

To further adjust an angle of the light beam, a steering voltage V2 can be applied to the second row of electrodes 542 to cause a corresponding second row of refractive shapes to form in the cladding. The second row of refractive shapes can further adjust an angle of the light beam and can additionally increase a size of each sub-aperture portion of the light beam. The steering voltage V1 can be held at the maximum value during the application of steering voltage V2. The adjustment in the angle of the light beam can increase as the value of the steering voltage V2 increases from zero through a range of intermediate steering values, and at fill steering, the steering voltage V2 can have a maximum value corresponding to a maximum adjustment in the angle of the light beam caused by the second row of electrodes. A value of the maximum voltage can be 100 V and a corresponding maximum adjustment in the angle of the light beam caused by the second row of electrodes can be 1 degree. In an example, the maximum voltage can be 100 V and a corresponding maximum adjustment in the angle of the light beam caused by the first row of electrodes can be in a range from 0 to 10 degrees. A maximum value of the steering voltage V2 can correspond to an adjusted angle of the light beam, such that each sub-aperture portion of the light beam can be incident upon a corresponding refractive shape in the third row of refractive shapes. At voltages beyond the maximum value of the steering voltage V2, each sub-aperture portion of the light beam can be incident upon more than one refractive shape in the third row of refractive shapes, such as can lead to losses in the light beam.

As illustrated in FIG. 5B, a voltage phase compensation voltage Vcomp can be applied to the phase compensation electrode 540 during the application of the steering voltage V2, such as to reduce spatial phase discontinuities in the light beam, such as those caused by different optical path lengths between adjacent portions of the second row of refractive shapes. The phase compensation voltage Vcomp can be increased as a value of the applied steering voltage V2 is increased. The second row of electrodes can be shaped such that when the steering voltage V2 is at a maximum voltage, spatial phase discontinuities in the light beam can be reduced, such that the applied phase compensation voltage Vcomp can be set to zero. For example, a size and shape of an individual refractive shape in the second row can provide an optical path length difference between a portion of the individual refractive shape and a corresponding portion of a neighboring individual refractive shape that can be an integer multiple of wavelengths of the light beam when a voltage applied to the second row is approximately zero volts or at a maximum voltage, such as to allow light to exit each individual refractive shape with a uniform output wavefront.

To further adjust an angle of the light beam, a steering voltage V3 can be applied to the third row of electrodes 543 to cause a corresponding third row of refractive shapes to form in the cladding. The third row of refractive shapes can further adjust an angle of the light beam and can additionally decrease a size of each sub-aperture portion of the light beam. The steering voltage V1 and the steering voltage V2 can be held at their respective maximum values during the application of the steering voltage V3. The adjustment in the angle of the light beam can increase as the value of the steering voltage V3 increases from zero through a range of intermediate steering values, and at full steering, the steering voltage V3 can have a maximum value corresponding to a maximum adjustment in the angle of the light beam caused by the third row of electrodes. A value of the maximum voltage can be 100 V and a corresponding maximum adjustment in the angle of the light beam caused by the third row of electrodes can be 1 degree. In an example, the maximum voltage can be 100 V and a corresponding maximum adjustment in the angle of the light beam caused by the first row of electrodes can be in a range from 0 to 10 degrees. A maximum value of the steering voltage V3 can correspond to an adjusted angle of the light beam, such that each sub-aperture portion of the light beam can be incident upon a corresponding refractive shape in the fourth row of refractive shapes. At voltages beyond the maximum value of the steering voltage V3, each sub-aperture portion of the light beam can be incident upon more than one refractive shape in the fourth row of refractive shapes, such as can lead to losses in the light beam.

As illustrated in FIG. 5B, a voltage phase compensation voltage Vcomp can be applied to the phase compensation electrode 540 during the application of the steering voltage V3, such as to reduce spatial phase discontinuities in the light beam, such as those caused by different optical path lengths between adjacent portions of the third row of refractive shapes. The phase compensation voltage Vcomp can be increased as a value of the applied steering voltage V3 is increased. The third row of electrodes can be shaped such that when the steering voltage V3 is at a maximum voltage, spatial phase discontinuities in the light beam are reduced, such that the applied phase compensation voltage Vcomp can be set to zero. For example, a size and shape of an individual refractive shape in the third row can provide an optical path length difference between a portion of the individual refractive shape and a corresponding portion of a neighboring individual refractive shape that can be an integer multiple of wavelengths of the light beam when a voltage applied to the third row is approximately zero volts or at a maximum voltage, such as to allow light to exit each individual refractive shape with a uniform output wavefront.

To further adjust an angle of the light beam, a steering voltage V4 can be applied to the fourth row of electrodes 544 to cause a corresponding fourth row of refractive shapes to form in the cladding. The fourth row of refractive shapes can further adjust an angle of the light beam and can additionally increase a size of each sub-aperture portion of the light beam. The steering voltage V1, the steering voltage V2, and the steering voltage V3 can be held at their respective maximum values during the application of the steering voltage V4. The adjustment in the angle of the light beam can increase as the value of the steering V4 increases from zero through a range of intermediate steering values, and at full steering, the steering voltage V4 can have a maximum value corresponding to a maximum adjustment in the angle of the light beam caused by the fourth row of electrodes. A value of the maximum voltage can be 100 V and a corresponding maximum adjustment in the angle of the light beam caused by the fourth row of electrodes can be 1 degree. In an example, the maximum voltage can be 100 V and a corresponding maximum adjustment in the angle of the light beam caused by the first row of electrodes can be in a range from 0 to 10 degrees.

As illustrated in FIG. 5B, a voltage phase compensation voltage Vcomp can be applied to the phase compensation electrode 540 during the application of the steering voltage V4, such as to reduce spatial phase discontinuities in the light beam, such as those caused by different optical path lengths between adjacent portions of the fourth row of refractive shapes. The phase compensation voltage Vcomp can be increased as a value of the applied steering voltage V4 is increased. The fourth row of electrodes can be shaped such that when the steering voltage V4 is at a maximum voltage, spatial phase discontinuities in the light beam are reduced, such that the applied phase compensation voltage Vcomp can be set to zero. For example, a size and shape of an individual refractive shape in the fourth row can provide an optical path length difference between a portion of the individual refractive shape and a corresponding portion of a neighboring individual refractive shape that can be an integer multiple of wavelengths of the light beam when a voltage applied to the fourth row is approximately zero volts or at a maximum voltage, such as to allow light to exit each individual refractive shape with a uniform output wavefront.

Figure 6C:
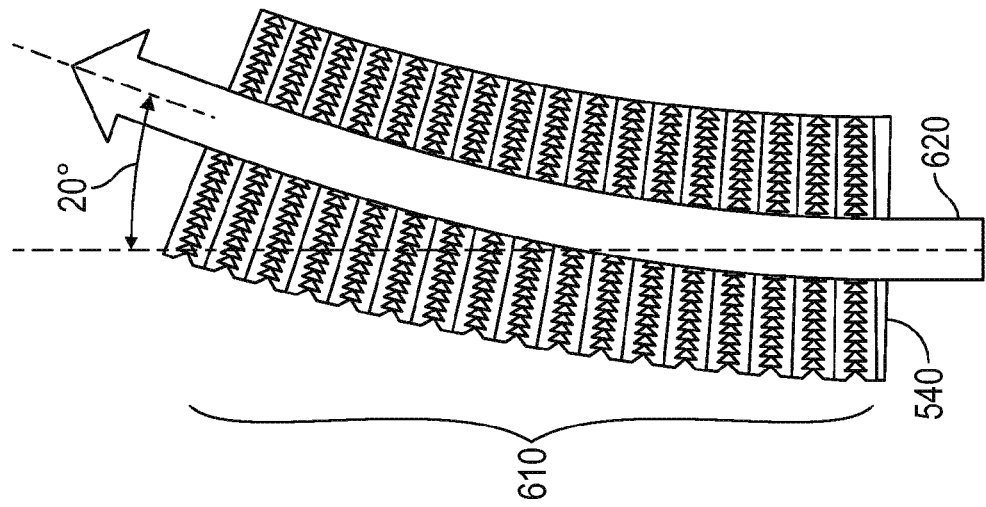
FIGS. 6A-6C illustrate examples of an electrode arrangement.
Figure 6B:
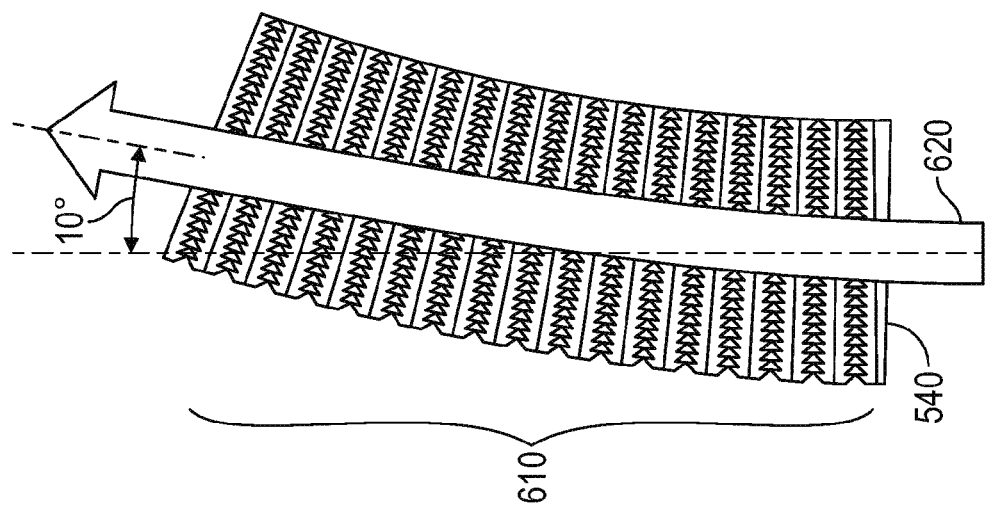
Figure 6A:
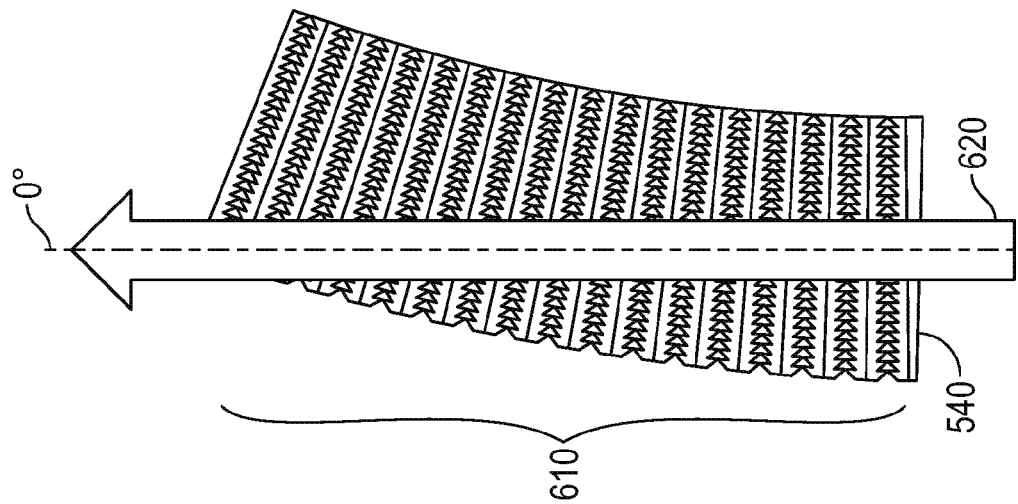

FIGS. 6A-6C illustrate examples of an electrode arrangement, such as the electrode arrangement 416 shown in FIG. 4. The electrode arrangement shown in FIGS. 6A-6C can include successive rows shaped similar to electrodes 541-544 as shown in FIG. 5A. The electrode arrangement can include a series of alternating row electrodes 610 shaped similar to the sub-aperture refractive elements shown in FIG. 1B. In the example shown in FIG. 6A, the row electrodes 610 can be electrically grounded, such as to provide no refractive shapes in a cladding of a waveguide, such as the upper cladding 408 of the waveguide 400. In an example where the row electrodes are electrically grounded, a light beam 620 entering the waveguide at an angle can exit the waveguide at the same angle. In the example shown in FIG. 6B, a maximum voltage can be applied to each of the row electrodes in the first half of the row electrodes 610 and the remaining row electrodes can be electrically grounded, such as to provide corresponding refractive shapes in a cladding of a waveguide, such as the upper cladding 408 of the waveguide 400. In an example where a maximum voltage can be applied to the first half of the row electrodes and the remaining row electrodes can be electrically grounded, a light beam 620 entering the waveguide can exit the waveguide at an angle of up to 10 degrees relative to an entrance angle. In the example shown in FIG. 6C, a maximum voltage can be applied to each of the row electrodes 610, such as to provide corresponding refractive shapes in a cladding of a waveguide, such as the upper cladding 408 of the waveguide 400. In an example where a maximum voltage can be applied to all of the row electrodes, a light beam 620 entering the waveguide at an angle can exit the waveguide at an angle of up to 20 degrees relative to an entrance angle.

Figures 7A, 7B:
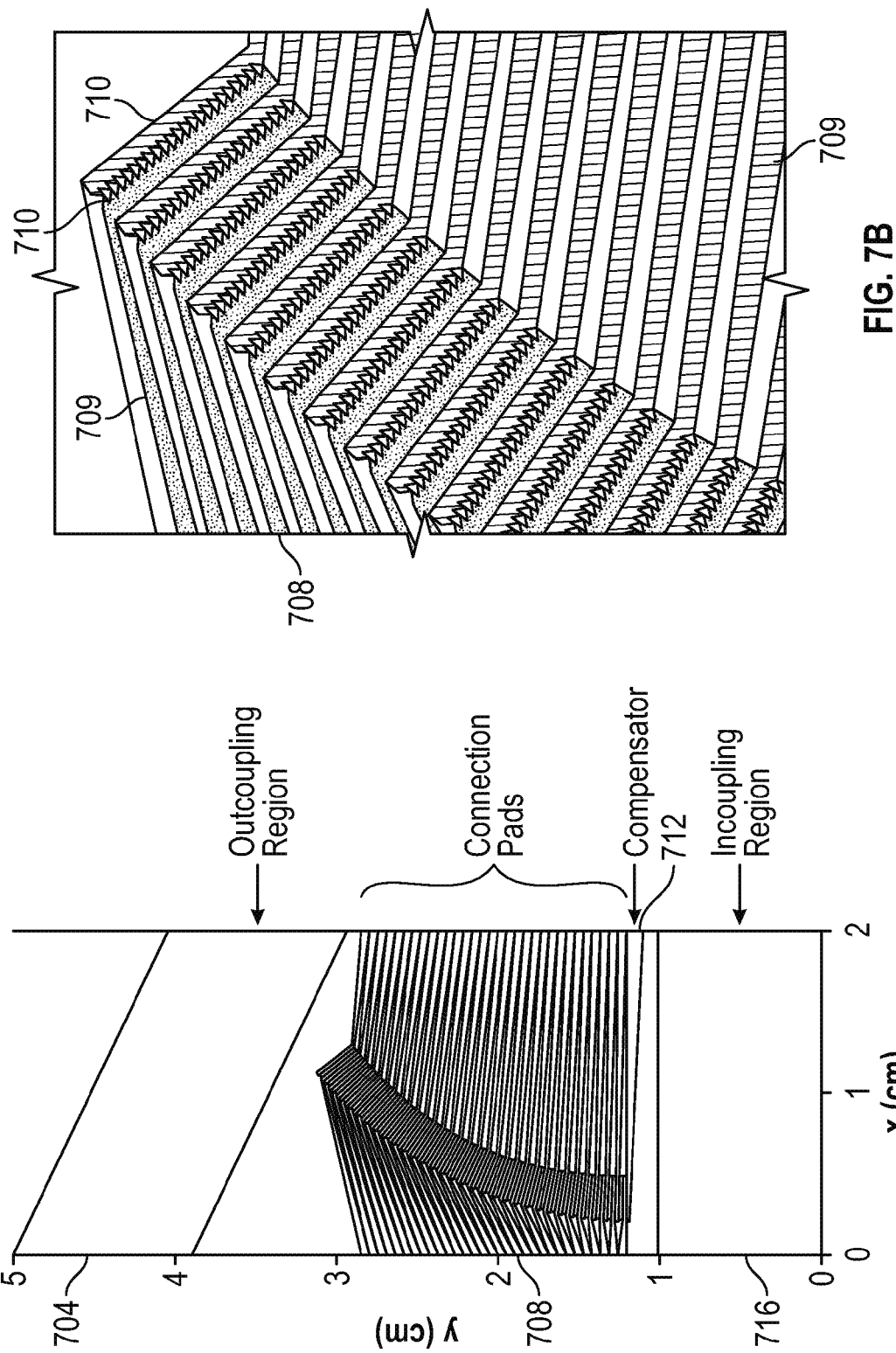
FIGS. 7A and 7B illustrate an example of an electrode arrangement.

FIGS. 7A and 7B illustrate an example of a waveguide configured to steer a light beam. In the example shown in FIGS. 7A and 7B, the waveguide can include an outcoupling electrode 704, an electrode arrangement 708, a compensation electrode 712, and an incoupling region 716. The electrode arrangement 708 can include connection pads 709 and prism rows 710. In the example illustrated in FIGS. 7A and 7B, there can be 62 prism rows that can provide a steering range of a light beam of 99 degrees. The connection pads 709 can provide a connection from at least one voltage source to the prism rows 710. The electrode arrangement 708 illustrated in FIGS. 7A and 7B can operate similar to the electrode arrangements shown in FIGS. 6A-6C. In the example illustrated in FIGS. 7A and 7B, the prism rows 710 can provide a corresponding refractive shape in a cladding of the waveguide. A wavelength of the light beam can be 1.55 µm. The corresponding refractive shape can have an index of refraction in a range from 1.7453 to 1.7703 corresponding to an applied voltage range of zero volts to a maximum voltage. The prism rows 710 can include 45 degree prisms and a width of an individual prism in the prism rows 710 can be 121 µm. The width of an individual prism in the prism rows can be selected to reduce spatial phase discontinuities in the light beam. For example, the size of an individual prism in the prism rows can be selected, such as to provide an optical path length difference between corresponding portions of neighboring individual prisms that is an integer number of wavelengths of the light beam. The waveguide illustrated in FIGS. 7A and 7B can be optimized to steer a light beam having a wavelength of 1.55 µm. An entrance aperture of the waveguide can be 2.8 mm, a length of the waveguide can be 5 cm, a width of the waveguide can be 2 cm, and a length of the incoupling region 716 can be 1 cm.

Figure 8:
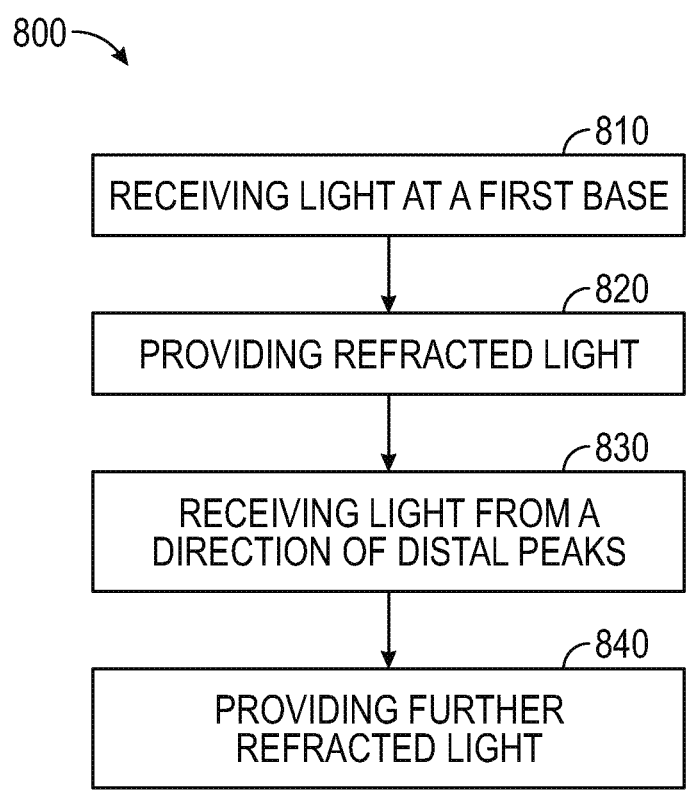
FIG. 8 illustrates a method of adjusting an angle of a light beam.

FIG. 8 illustrates a method of adjusting an angle of a light beam with reduced diffractive losses, such as by using an arrangement of sub-aperture refractive elements as illustrated in FIG. 1A. A. A first base interconnecting projections in a first row can receive light (step 810). The received light can be provided toward a direction of distal peaks of the projections of the first row. Upon exiting the distal peaks, the light can be refracted towards interconnecting projections in a second row (step 820). The light can be received by the interconnecting projections in the second row (step 830). Upon entering the interconnecting projections in the second row, the light can be further refracted in a direction of a second base interconnecting the projections in the second row (step 840). In an example, a first electrode can be provided where the first electrode can be shaped to provide the base and projections in the first row by adjusting an index of refraction of a corresponding portion of electro-optic material in a cladding of a waveguide, such as waveguide 400. A second electrode can be provided, where the second electrode can be shaped to provide the base and projections in the second row by adjusting an index of refraction of a corresponding portion of electro-optic material in the cladding of a waveguide, such as waveguide 400. In an example, a full steering voltage can be applied to the first electrode to cause corresponding sub-aperture portions of the light beam to decrease in size to provide a separation between adjacent sub-aperture portions of the light beam. An intermediate steering voltage (e.g., a voltage greater than zero, but less than a maximum steering voltage) can be applied to the second electrode to counteract the decrease in the size of the corresponding sub-aperture portions of the light beam to reduce the separation between adjacent sub-aperture portions of the light beam. The first electrode and the second electrode can have the same cross-sectional shape and opposite orientations.

The invention claimed is:

1. An apparatus comprising an arrangement of sub-aperture refractive tapered projections for adjusting an angle of a light beam with reduced diffractive losses, the apparatus comprising:

a first row of the projections, configured to receive light at a first base interconnecting the projections in the first row, and provide refracted light toward a direction of distal peaks of the projections of the first row, wherein an individual one of the sub-projections in the first row includes a planar surface that is configured to refractively adjust an angle of a corresponding sub-aperture portion of the light beam and decrease a size of the corresponding sub-aperture portion of the light beam; and a second row of the projections, configured to receive light from a direction of distal peaks of the projections of the second row, which are arranged facing corresponding projections of the first row, the second row configured to provide further refracted light in a direction of a second base interconnecting the projections in the second row, wherein a corresponding individual one of the projections in the second row includes a planar surface that is configured to receive a sub-aperture portion of the light beam from a corresponding individual one of the sub-aperture refractive elements in the first row, further adjust an angle of the received corresponding sub-aperture portion of the light beam, and counteract a decrease in the size of the corresponding sub-aperture portion of the light beam caused by the individual one of the sub-aperture refractive elements in the first row.

2. The apparatus of claim 1, wherein the facing corresponding projections respectively include:

facing corresponding slanted first faces forming an obtuse angle with respect to each other, and slanted with respect to their respective first and second bases; and facing corresponding perpendicular second faces, aligned with respect to each other, and perpendicular to their respective first and second bases.

3. The apparatus of claim 1, wherein an individual one of the projections in the first row includes a first refractive surface having a first orientation and a corresponding individual one of the projections in the second row include a second refractive surface having a second orientation, wherein the first refractive surface and the second refractive surface have the same shape and the first orientation is opposite to the second orientation.

4. The apparatus of claim 1, wherein an individual one of the projections in the first row is shaped such that a difference in an optical path length between an adjacent portion of the individual one of the projections and an adjacent portion of a neighboring projection is an integer number of wavelengths of the light beam.

5. The apparatus of claim 1 comprising successive first and second rows of projections, wherein the distal peaks of a successive first row face the distal peaks of a corresponding successive second row.

6. The apparatus of claim 1, comprising:
a waveguide core shaped to guide the light beam along a length of a waveguide;
a cladding including an electro-optic material capable of an interaction with a portion of the light beam; and
at least one electrode shaped and arranged to adjust an angle of the light beam in an in-plane direction by adjusting an index of refraction of the electro-optic material.

7. The apparatus of claim 6, comprising a row of compensation electrodes shaped and arranged to provide an adjustable phase shift between adjacent sub-aperture portions of the guided light beam to reduce phase discontinuities in adjacent sub-aperture portions of the light beam.

8. The apparatus of claim 1 wherein the second row of projections is tilted with respect to the first row of projections to accommodate light refracted by the first row of projections.

9. A waveguide for adjusting an angle of a light beam in an in-plane direction, the waveguide comprising:
a waveguide core shaped to guide a light beam along a length of the waveguide;
a cladding including an electro-optic material capable of an interaction with a portion of the light beam;
electrodes shaped and arranged to adjust an angle of the light beam in an in-plane direction by adjusting an index of refraction of the electro-optic material, wherein the arrangement of electrodes includes:
a first row of projections interconnected by a first base and including a planar surface configured to adjust an angle of corresponding sub-aperture portions of the light beam and decrease a size of the corresponding sub-aperture portions of the light beam by adjusting an index of refraction of the corresponding electro-optic material; and
a second row of projections interconnected by a second base and including a planar surface configured to further adjust an angle of corresponding sub-aperture portions of the light beam and counteract a decrease in the size of the corresponding sub-aperture portions of the light beam caused by the first row of projections by adjusting an index of refraction of the corresponding electro-optic material.

10. The waveguide of claim 9, wherein an individual one of the projections in the first row includes a first shape having a first orientation and a corresponding individual one of the projections in the second row includes a second shape having a second orientation, wherein the first shape and the second shape are the same and the first orientation is opposite to the second orientation.

11. The waveguide of claim 9, wherein an individual one of projections in the first row and a corresponding individual one of the projections in the second row have a triangular shape.

12. The waveguide of claim 9, wherein an individual one of the projections in the first row is capable of adjusting an angle of the light beam by an angle in the range of zero to two degrees.

13. The waveguide of claim 9, wherein an individual one of the projections in the first row is shaped such that a difference in an optical path length between an adjacent portion of a corresponding region of the electro-optic material and a corresponding portion of electro-optic material corresponding to a neighboring projection is an integer number of wavelengths of the light beam when a full steering voltage or zero voltage is applied to the first row of projections to provide a uniform output wavefront.

14. The waveguide of claim 9, wherein the arrangement of electrodes includes a row of phase compensation electrodes shaped to provide an adjustable phase shift between adjacent sub-aperture portions of the guided light beam to reduce phase discontinuities in adjacent portions of the light beam at intermediate steering voltages.

15. The waveguide of claim 9 comprising successive first and second rows of projections, wherein the distal peaks of a successive first row face the distal peaks of a corresponding successive second row.

16. The waveguide of claim 9 wherein an individual one of projections in the first row and a corresponding individual one of the projections in the second row have a wedge shape.

17. A method of using an arrangement of sub-aperture refractive tapered projections for adjusting an angle of a light beam with reduced diffractive losses, the method comprising:
receiving light at a first base interconnecting projections in a first row, and providing via planar surfaces, refracted light toward a direction of distal peaks of the projections of the first row;
receiving light from a direction of distal peaks of projections of a second row, which are arranged facing corresponding projections of the first row and, using the second row, providing via planar surfaces, further refracted light in a direction of a second base interconnecting the projections in the second row;
providing a first electrode shaped to provide the base and projections in the first row by adjusting an index of refraction of a corresponding portion of an electro-optic material in a cladding of a waveguide and a second electrode shaped to provide the base and projections in the second row by adjusting an index of refraction of a corresponding portion of the electro-optic material in the cladding of the waveguide; and
applying a full steering voltage to the first electrode to cause corresponding sub-aperture portions of the light beam to decrease in size to provide a separation between adjacent sub-aperture portions of the light beam, and applying an intermediate steering or full steering voltage to the second electrode to counteract the decrease in the size of the corresponding sub-aperture portions of the light beam to reduce the separation between adjacent sub-aperture portions of the light beam.

18. The method of claim 17, comprising providing a first electrode shaped to provide the base and projections in the first row and a second electrode shaped to provide the base and projections in the second row, the first electrode and the second electrode having the same shape and an opposite orientation.

19. The method of claim 17, comprising providing a first electrode shaped to provide the base and projections in the first row and a second electrode shaped to provide the base and projections in the second row, wherein the projections in the first row and the projections in the second row have a triangular shape.

20. The method of claim 17 wherein the first electrode is shaped to provide the base and projections in the first row by decreasing the index of refraction of a corresponding portion of the electro-optic material in the cladding of the waveguide and the second electrode is shaped to provide the base and projections in the second row by decreasing the index of refraction of a corresponding portion of the electro-optic material in the cladding of the waveguide.

21. The method of claim 17 wherein an individual one of the projections in the first row is shaped such that a difference in an optical path length between an adjacent portion of a corresponding region of the electro-optic material and a corresponding portion of the electro-optic material corresponding to a neighboring projection is an integer number of wavelengths of the light beam when the full steering voltage or a zero voltage is applied to the first electrode to provide a uniform output wavefront.

22. The method of claim 17 comprising providing a row of phase compensation electrodes shaped to provide an adjustable phase shift between adjacent sub-aperture portions of the guided light beam to reduce phase discontinuities in adjacent portions of the light beam at intermediate steering voltages.

23. The method of claim 17 comprising providing a first electrode shaped to provide the base and projections in the first row and a second electrode shaped to provide the base and projections in the second row, wherein the projections in the first row and the projections in the second row have a wedge shape.

* * * * *